United States Patent [19]

Fritch

[11] Patent Number: 5,377,447
[45] Date of Patent: Jan. 3, 1995

[54] LANDSCAPE EDGING APPARATUS AND METHOD

[76] Inventor: John R. Fritch, 4334 Five Points Rd., Corpus Christi, Tex. 78410

[21] Appl. No.: 967,111

[22] Filed: Oct. 27, 1992

Related U.S. Application Data

[63] Continuation-in-part of Ser. No. 838,721, Mar. 11, 1986, and a continuation-in-part of Ser. No. 179,858, Apr. 11, 1988, and a continuation-in-part of Ser. No. 343,877, Apr. 27, 1989, Pat. No. 5,157,867, which is a continuation-in-part of Ser. No. 908,601, Sep. 18, 1986, Pat. No. 4,831,776.

[51] Int. Cl.$^6$ ................................................ A01G 1/08
[52] U.S. Cl. ........................................ 47/33; 52/102; 404/7
[58] Field of Search ............... 47/33; 52/102, 717.05, 52/716.1, 776; 405/115, 107; 404/7, 8

[56] References Cited

U.S. PATENT DOCUMENTS

| | | | |
|---|---|---|---|
| 1,001,169 | 8/1911 | Ross | 52/658 |
| 2,909,328 | 10/1959 | Babyak | 239/268 |
| 2,994,905 | 8/1961 | Franker | 52/717.05 |
| 3,144,700 | 8/1964 | Heltzel | 249/3 |
| 3,735,540 | 3/1973 | Thaler | 52/96 |
| 4,201,359 | 5/1980 | Baslow | 52/716.1 |
| 4,472,913 | 9/1984 | Hickman | 52/96 |
| 4,586,301 | 5/1986 | Hickman | 52/96 |

FOREIGN PATENT DOCUMENTS

| | | | |
|---|---|---|---|
| 123253 | 2/1931 | Austria | 52/96 |
| 2022670 | 12/1979 | United Kingdom | 52/776 |

Primary Examiner—Henry E. Raduazo

[57] ABSTRACT

In a preferred embodiment, an elongated landscape edging strip formed of flexible material has a substantially flat planar bottom support surface and comprises an upstanding, laterally reinforced retainer portion of channel-shaped cross section intermediate and integrally extruded with a flat flexible mowing strip and a flat flexible anchoring strip. The retainer portion, mowing strip, and anchoring strip are secured in conformity to the ground contour along a landscape border. In preferred embodiments, the retainer portion abuts a fence or retains landscape fill on landscaping sheet having an edge secured underneath the landscaping edging strip.

2 Claims, 5 Drawing Sheets

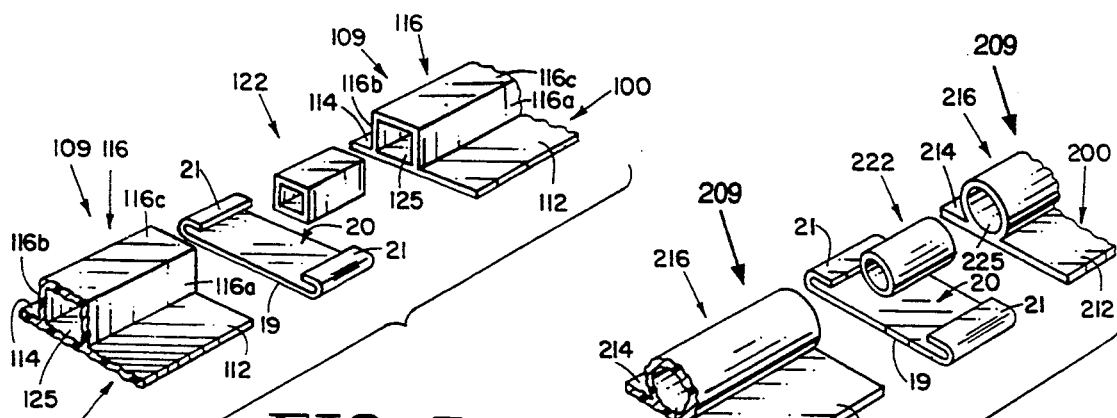
FIG. 5
FIG. 6
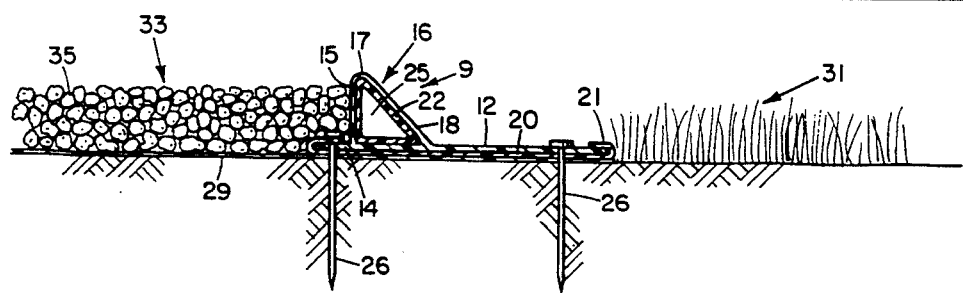
FIG. 3
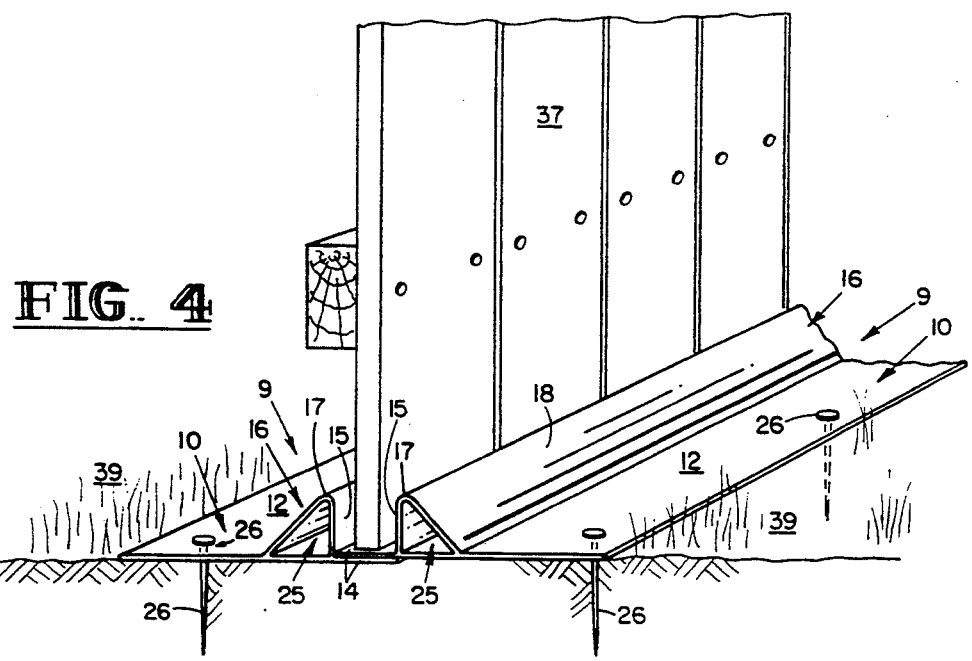
FIG. 4

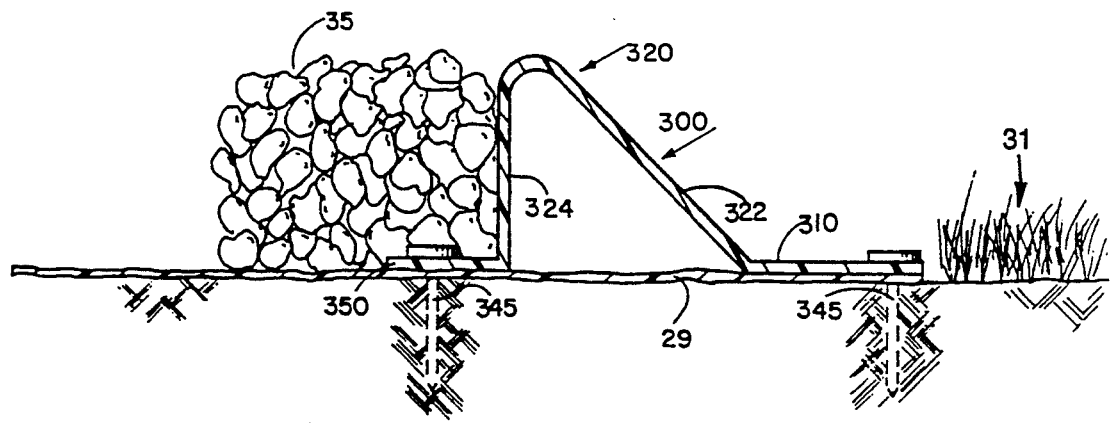
FIG_10
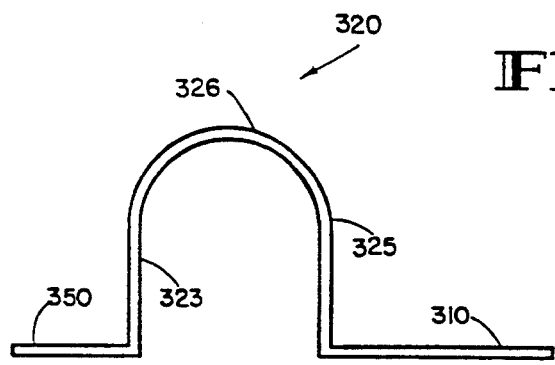
FIG_11A
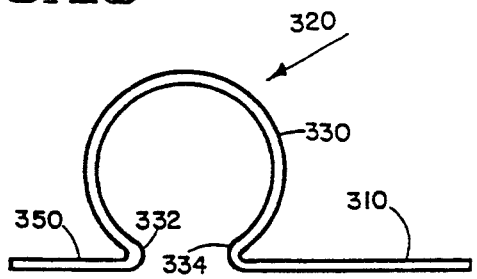
FIG_11B
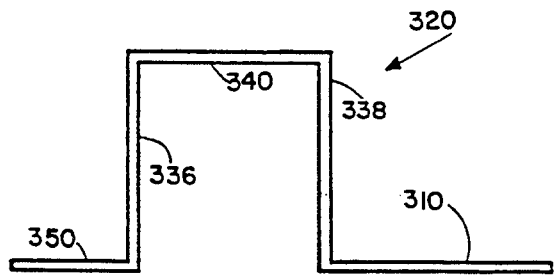
FIG_11C
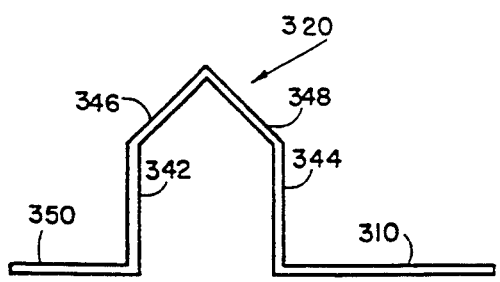
FIG_11D

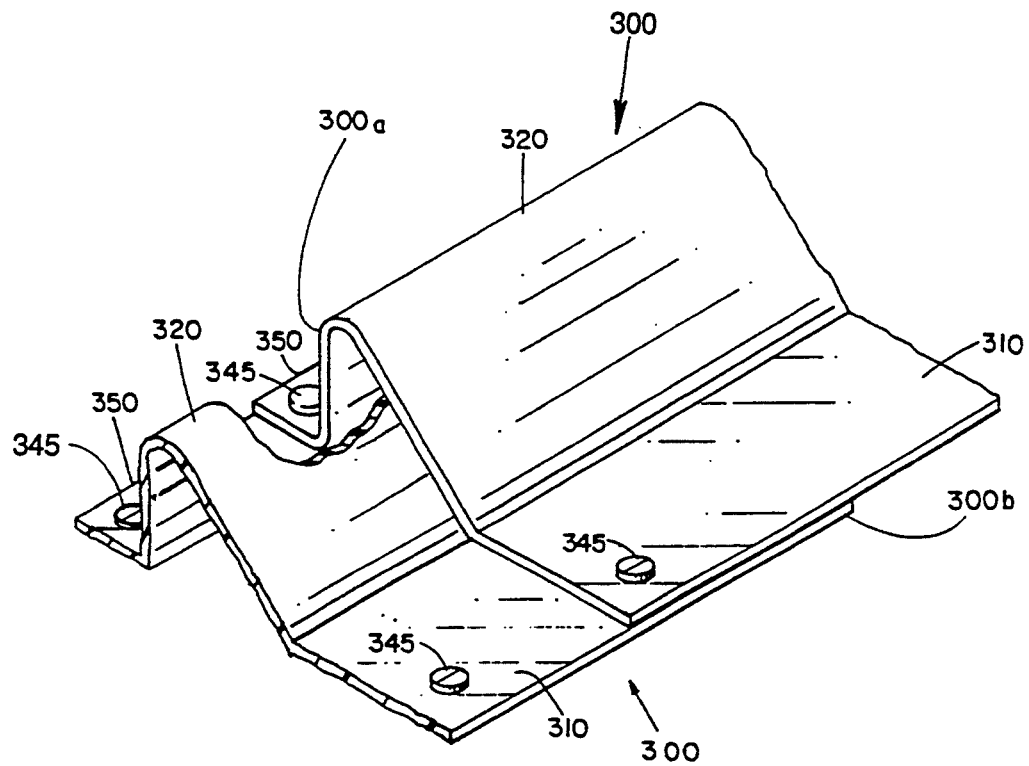
FIG_12
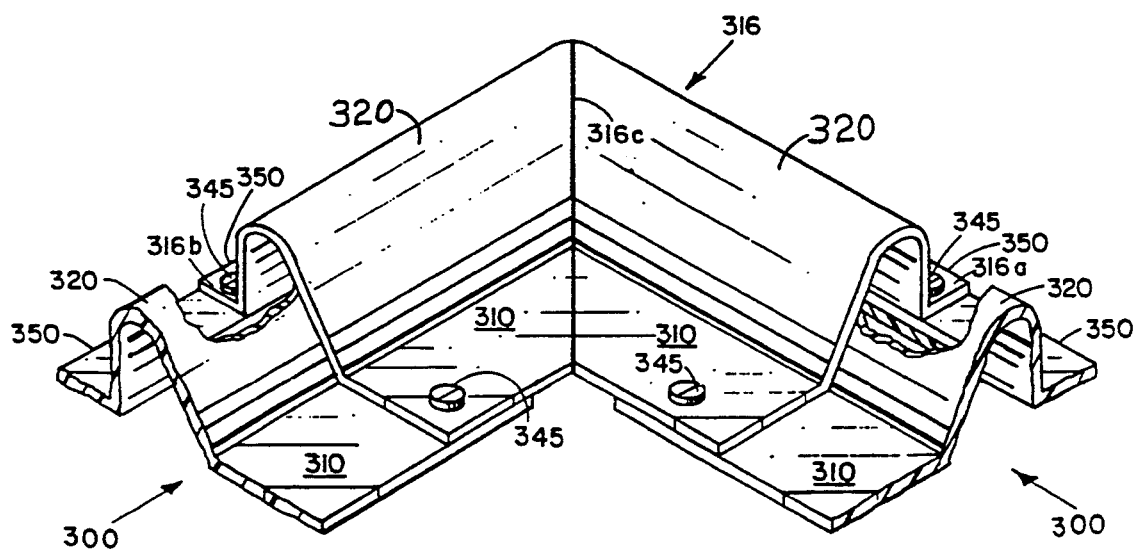
FIG_13

LANDSCAPE EDGING APPARATUS AND METHOD

RELATIONSHIP TO OTHER CO-PENDING APPLICATIONS

This application constitutes a continuation-in-part of co-pending U.S. patent application No. 06/838,721, filed Mar. 11, 1986; No. 07/179,858 filed Apr. 11, 1988, and No. 07/343,877 filed Apr. 27, 1989 now U.S. Pat. No. 5,157,867. Application No. 07/179,858 and No. 07/343,877 are a continuation-in-part and a continuation, respectively, of U.S. patent application No. 06/908,601 filed Sep. 18, 1986 and published May 23, 1989 with Pat. No. 4,831,776, which is a continuation-in-part of application No. 06/838,721.

BACKGROUND OF THE INVENTION

1. Field of the Invention

The present invention relates to an apparatus and method for landscape edging, and more particularly to a mowing and retaining strip which can be used for edging beds of landscape fill and for preventing the growth of vegetation under and adjacent to fencing.

2. Summary of the Related Art

Landscape edgings and fence guards heretofore proposed generally consist of a retaining strip, a mowing strip, or both. Retaining strips (RS) are elongated barriers installed longitudinally along the surface of the ground such that the barrier is substantially perpendicular to the ground. In landscape edgings, RS are used either to separate different types of landscaping materials (such as lawn, gravel walkways, beds of decorative rock, beds of bark, gardens etc.) or to retain elevated beds of earth or other landscaping fill. In fence guards, RS are abutted along the base of a fence and are used to maintain a desired spatial relationship between a mowing strip and the fence and thus protect the bottom edge of the fence from damage by a lawnmower, a lawn edging device, or animals; to protect lawnmowers, lawn edging devices, and animals from damage by the bottom edge of the fence; and to discourage animals from digging underneath fences.

Mowing strips (MS) are installed along a lawn border and have a top face that is flush with the surface of the ground. By running the wheels attached to one side of a lawnmower onto and along a MS, one can cut all grass immediately adjacent to the MS. Consequently, MS are used to reduce or eliminate the need for horizontal trimming of grass at lawn borders.

Most MS currently in use are constructed by end to end assemblage of rigid segments formed from concrete, wood, or brick. Such MS must be buried into the ground so that the top surface of the strip is essentially at ground level. Such subterranean installation is tedious, requiring the digging of trenches, and, in the case of concrete MS, construction of forms. Due to their thickness, none of these MS are as easily installed under existing fence as in open, unobstructed terrain. Concrete or mortared brick MS are very difficult to remove, and cannot be conveniently reused in a different location. Unmortared bricks and unstaked wood occassionally get knocked out of position. Wood MS suffer the additional disadvantages of rotting and of not conforming easily to changes in ground slope.

MS can be classified as being of the continuous elongated type or of the segmented type. The segmented type comprises a plurality of relatively short sections (segments) installed in series. Because the sections composing segmented MS are relatively short (typically less than 4 feet) in length, a relatively large number of sections is needed to construct a given length of MS, and the resulting MS will have a relatively large number of joints between sections. One of the problems with segmented MS is that their construction can be tedious and time-consuming, requiring the assembly of a relatively large number of pieces. An even more serious problem with segmented MS is maintenance of the joints between sections. If no deliberate attempt is made to connect adjacent abutted sections of a segmented MS, grass can easily encroach across the MS barrier between the abutted sections, and also, the sections can easily be knocked out of alignment.

Examples of segmented MS that demonstrate these problems are those constructed of concrete blocks. Furthermore, virtually all deliberate attempts to overcome these problems by connecting or overlapping adjacent MS sections are defeated by the natural expansion and contraction of the ground that accompanies freeze/thaw cycles, changes in ground moisture content, fire ant activity, or the like. For example, such expansion and contraction of the ground often cracks the joints of mortared brick MS. Thus it is very desirable to minimize the number of joints in a MS.

Poured concrete MS, although not of the segmented type, also are often cracked by the natural expansion and contraction of the ground.

A continuous elongated MS differs from a segmented MS in that, within the limits of practical manufacture, transportation, and storage, the entire length of a continuous elongated MS is provided by a single, integral, continuous strip. Another distinction between continuous elongated MS and segmented MS is that continuous elongated MS are typically manufactured in lengths exceeding 4 feet and are intended to be cut to the desired length by the installer. In contrast, few if any of the sections of a segmented MS are altered in length by the installer.

U.S. Pat. Nos. 3,384,351 and 4,381,822 describe continuous elongated flexible thin plastic MS that are staked onto the top of the ground adjacent or under a fence. Such MS avoid all of the disadvantages just described for concrete, wood, or segmented MS, but cannot function as retainer strips (RS) for landscaped beds.

Landscaping sheet is often used to prevent growth of weeds or grass in flower beds, bush beds, or areas covered with landscape fill. The edges of landscaping sheet must be secured to prevent them from being shredded by a lawnmower or from being overrun with weeds and grass. In this patent application, the term "landscaping sheet" includes geotextile; plastic mulch; landscape, landscaping, or earth fabric, film, sheet, blanket or mat; and the like. In this patent application, the term "landscape fill" includes sand, bark, mulch, or hard surface means such as concrete, asphalt, mortared brick, loose brick, paving stones, rock, gravel, and the like.

If the edges of landscaping sheet are secured by partially buried MS, several problems result. One is that the landscaping sheet edges tend to loosen and pull up as the surrounding ground expands and contracts with freeze/thaw cycles, changes in ground moisture content, fire ant activity, or the like. Another is that dirt and debris can wedge between the landscaping sheet and the MS, providing gaps through which weeds will grow. Still another problem is that landscaping sheet tends to be stressed and torn at the points where it is bent and buried next to a partially buried MS. The frequency at which landscaping sheet must be maintained or replaced entirely greatly exceeds the usual and expected life of MS. The required maintenance or replacement of landscaping sheet usually necessitates removal and reinstallation of the MS, which, for partially buried MS, is relatively difficult. Removal and reinstallation of MS also would be required to service drip irrigation tubing and outlets placed underneath landscaping sheet with edges secured by MS.

Thin plastic RS secured to the ground by a substantial buried component are disclosed in U.S. Pat. Nos. 3,387,786, 3,788,001, and 4,281,473. The buried component provides two functions: it supports the above-ground component and it restricts grass from growing underneath the strip into an area where grass is not wanted. However, as with concrete, wood, or brick MS, installation of the buried component is tedious, requiring the digging of trenches. Also for the same reasons as with concrete, wood, or brick MS, use of RS with buried components to secure the edges of landscaping sheet is not practical. Although thin plastic retaining strips bend easily in the horizontal plane perpendicular to their axis of height, such strips lack the vertical flexibility needed to conform to changes in ground slope while maintaining a perpendicular relationship between the ground surface and the retaining strip barrier.

Relatively thin plastic RS with buried components all have the serious problem of tending to pull up out of the ground, permitting grass to encroach underneath the strip. To reduce this tendency, several means have been used individually or in combination, including horizontal ribbing or corrugation, stakes that are driven diagonally through the underground portion before it is buried, stakes that clip over the top edge of the strip and that are driven into the ground immediately next to the strip, and upwardly angled flanges attached to the buried portion of the RS. However, none of these means adequately reduces the tendency of thin plastic RS to pull up out of the ground, particularly when the ground is subject to heaving by freezing or changes in moisture content.

Relatively thick RS installed on the top of the ground, such as landscaping timbers or the RS described in U.S. Pat. No. 1,916,494 are not sufficiently flexible to conform easily to changes in ground slope. Such inflexibility usually necessitates a vertically angled joint in the RS to accommodate a significant change in ground slope. Even when such joints are used, the inability of a RS to conform to changes in ground slope will result in occassional gaps between the ground and the RS. Grass can encroach underneath the RS through such gaps. When thick RS installed on the top of the ground are used to secure the edges of landscaping sheet on a ground surface of changing slope, occassional gaps will occur between the landscaping sheet and the RS. The gaps between the landscaping sheet and the RS will permit grass to encroach underneath the RS through the gaps into an area where grass is not wanted.

Lawn edging strips involving the combination of a mowing strip and a retainer strip have been proposed. The MS/RS combinations disclosed in U.S. Pat. Nos. 2,184,904, 2,713,751, 3,515,373, 3,495,352, 3,545,127, and 4,372,079 all have a substantial portion of their RS buried underground. Furthermore, the MS and the RS of these combinations often are not integrally connected. Such combinations have the following disadvantages.

The presence of the underground RS component precludes use of the MS to secure landscaping sheet.

Installation of the underground RS components almost always requires the labor-intensive digging of trenches. Even when the RS are, in principle, thin enough to be driven into the ground with a hammer, this method of installation is usually less effective than that of digging a trench, placing the RS inside the trench, and packing soil firmly against both sides of the RS. In the case of a thin continuous elongated RS, one end can be hammered into the ground only a very short distance before the rest of the RS must be driven into the ground by a nearly equivalent distance. However, hammering on one end of the RS tends to pull the other end of the RS out of the ground. The iterative nature of such installation results in the ground being pushed away from the walls of the RS, preventing a tight fit of the RS into the ground and leaving the RS poorly secured.

Thin retaining strips, whether hammered or buried into the ground, all have the serious problem of tending to be pulled up out of the ground by the natural expansion and contraction of the ground caused by freeze/thaw cycles, changes in ground moisture content, fire ant activity, or the like. Special means are usually employed for alleviating this problem, particularly upwardly angled flanges attached in a lengthwise parallel fashion to the underground portion of the RS. However, such flanges significantly increase the difficulty of driving the RS into the ground. Even when such RS are buried into the ground, such flanges still do not adequately prevent the RS from pulling up out of the ground. Other means for securing thin RS into the ground also are not adequate.

U.S. Pat. No. 3,545,127 discloses mowing strips integrally attached to retaining strips having underground components. With such combinations, it is very difficult to pack firmly with soil that side of the underground RS which is underneath the MS. Failure to pack this side of the underground RS component firmly with soil would leave the MS/RS combination poorly secured to the ground and would leave the MS poorly supported from underneath. To avoid these problems, MS/RS combinations with underground RS components usually are non-integral, requiring attachment of the MS to the RS after the RS is installed into the ground. U.S. Pat. Nos. 2,184,904, 3,495,352 and 4,372,079 disclose such combinations. However, in comparison to an integral mowing strip/retaining strip combination, a two-piece mowing strip/retaining strip combination is far more likely to become separated or disconnected, permitting grass to encroach through the resulting gap.

RS of previous MS/RS combinations are either constructed of inherently rigid materials or are sufficiently thick to severely restrict the vertical flexibility of both the RS and the attached MS. This reduced vertical flexibility causes gaps to occur between the ground and the MS in regions of changing ground slope. The presence of such gaps creates several problems. First, the gaps can make mowing along the mowing strip difficult by requiring a substantial sideways tilt of the lawnmower. Second, the gaps can cause the lawnmower blade to contact the MS. Third, the gaps can prevent the grass adjacent to the MS from being cut evenly.

Segmented MS/RS combinations have all of the problems described above for segmented MS. U.S. Pat. No. 3,777,421 discloses segmented MS/RS combinations constructed of cap members "snapped" onto base plates secured to the ground. Each cap member is an integral combination of a flat horizontal section forming part of the MS and a vertical wall forming part of the RS. However, the MS/RS combination of U.S. Pat. No. 3,777,421 has the following disadvantages.

Landscape edgings of this type are relatively complicated assemblies of base plates and cap members. Adjoining cap members are preferably interlocked by underlapping base plates. If adjoining base plates are not precisely aligned, the tabs in the overlapping cap members will not "snap" into the corresponding slots in the base plates. Precise alignment and overlap of a relatively large number of segments is unnecessarily complicated, time-consuming, and tedious.

Natural forces, such as expansion and contraction of the ground with freeze/thaw cycles, changes in ground moisture content, fire ant activity, and the like, will cause the joints between adjacent cap members to become separated or jammed. Even a slight separation provides an opportunity for grass to grow between cap members and encroach into an area where grass is not wanted. The stress on jammed cap members can pop them off of the base plates. The use of shiplap joints between cap members does not adequately overcome these problems. The relatively large number of joints present in segmented landscape edgings of this type greatly increases the effort required to maintain separated or jammed joints.

Another disadvantage is that landscape edgings of this type do not conform easily to changes in ground slope. This deficiency, which has the undesirable consequences described above, arises from several factors. One factor is that the cap members of these landscape edgings are stated to be constructed of a relatively rigid material such as filled plastic or fibrous concrete. Such rigid materials inherently prevent the landscape edging from conforming easily to changes in ground slope. Another factor is that the ground might dip between the ends of a cap member, and no means are provided for pulling the center of a cap member into a dip.

U.S. Pat. No. 2,842,344 discloses a rigid landscape edging that is a combination of a MS and a flat vertical wall RS. U.S. Pat. No. 3,713,624 discloses a fence guard that is a combination of a MS and a flat vertical wall retaining strip. Rigid MS/flat vertical wall RS combinations have the following disadvantages.

RS must have sufficient mechanical strength to avoid gross deformation by downward or lateral forces. Such strength is particularly critical when RS are used to retain the gravel in gravel walkways because of the tendency of the gravel to shift laterally when it is walked upon. However, flat vertical wall RS that have adequate mechanical strength to withstand this lateral force are not sufficiently flexible to allow a MS/RS combination to conform easily to changes in ground slope.

Other problems associated with providing flat vertical wall RS with adequate mechanical strength depend on the specific means used to provide such strength. For example, a MS/flat vertical wall RS combination could be made to have adequate mechanical strength by constructing it from a relatively rigid material. However, the use of a relatively rigid material has at least two problems other than that of not permitting the RS/MS combination to conform easily to changes in ground slope.

The first problem is that as a lawnmower is rolled onto one end of a relatively rigid MS, the stake securing the other end of the strip often tends to be pulled up out of the ground. MS constructed of a flexible material such as polyethylene or an elastomer do not have this problem.

The second problem is that it is sufficiently difficult to drive stakes through relatively rigid MS to warrant deliberate means for accommodating stakes. The means disclosed in U.S. Pat. Nos. 2,842,344 and 3,713,624 is integral attachment of the stakes to the MS/RS combinations. Integral attachment of the stakes to the MS/RS combination has at least two disadvantages. One is that it is unlikely that the stakes will be attached in the locations where they will be most needed to accommodate the peculiarities (e.g., changes in ground slope) of any given installation site. Another disadvantage is that a series of stakes attached along the length of a rigid MS/RS combination cannot be driven into the ground one at a time. Instead, the stakes must be driven into the ground by a more difficult and more time-consuming iterative process, each iteration of which comprises driving each stake into the ground only a very short distance. This iterative process is similar to that needed to hammer a thin rigid continuous elongated RS into the ground.

Besides having insufficient flexibility to conform easily to changes in ground slope, a rigid flat vertical wall RS cannot be adequately secured to the ground by attachment to a flexible MS. The RS would yield to lateral forces simply by bending the flexible MS near the joint with the RS. Thus both the rigid RS and the flexible MS would have to be secured to the ground directly by separate means. Another problem with the combination of a flexible mowing strip and a rigid flat vertical wall retaining strip is that the manufacture of such a combination would be relatively expensive, would not provide a strong joint between the MS and the RS, and would yield a warped product.

Perhaps the most significant problem with any MS/flat vertical wall RS combination is that the retaining strips of all such combinations buckle or crimp when forced to conform to changes in ground slope, regardless of the flexibility of the material from which the combination is constructed.

OBJECTS OF THE INVENTION

It is, therefore, an object of the present invention to overcome the previously described disadvantages and limitations of prior art constructions.

It is a further object of the present invention to provide a simple device for dividing beds of landscape fill from mowable lawn areas that is less expensive, more easily installed, and more easily maintained than other devices having similar purpose.

A further object of the present invention is to provide a landscape edging which restricts encroachment of grass and grass roots underneath.

A further object of the present invention is to provide a landscape edging having a mowing strip which is thin enough that the blades of a lawnmower are unlikely to hit the mowing strip when a mower is used by running the wheels over the mowing strip.

A further object of the present invention is to provide a landscape edging having a mowing strip and a retaining strip which are integral in construction and not likely to be separated or disconnected.

Another object of the present invention is to provide a landscape edging requiring assembly of a minimal number of pieces.

Another object of the present invention is to provide a landscape edging having a minimal number of joints, thus limiting the possibility that grass might grow between or through the joints.

Another object of the present invention is to provide a landscape edging which can be installed without the necessity of digging or of disturbing existing land contours.

Another object of the present invention is to provide a landscape edging which can receive spikes, stakes or similar securing means without prefabrication of a hole and without damage to the mowing strip or flange through which the stakes are driven.

A further object of the present invention is to provide a landscape edging wherein spikes or stakes may be accommodated at any location at which they are needed to conform the landscape edging to changes in ground slope at the installation site.

Another object of the present invention is to provide a landscape edging which can be easily removed and which can be reinstalled or reused.

A further object of the present invention is to provide a landscape edging which can be quickly and easily installed underneath and along the bottom of an existing fence to prevent growth of vegetation along the fence line and facilitate mowing adjacent to the fence line.

Yet another object of the present invention is to provide a landscape edging which can be used in combination with landscaping sheet to quickly and easily construct beds of landscape fill separate from lawn areas.

A further object of the present invention is to provide a landscape edging which functions as a practical means for securing landscaping sheet to the ground and which prevents the edges of landscaping sheet from being shredded by a mower.

Another object of the present invention is to provide means for securing landscaping sheet to the ground which does not require bending, stressing, or tearing of the landscaping sheet as it is secured to the ground.

A further object of the present invention is to provide a landscape edging which prolongs the useful life of landscaping sheet by eliminating gaps where weeds can grow or points where the sheet must be bent or buried adjacent to the edging.

A further object of the present invention is to provide a landscape edging which is sturdy yet sufficiently flexible to conform easily to changes in ground slope.

A further object of the present invention is to provide a landscape edging which can conform to changes in ground slope with minimal buckling or crimping.

A further object of the present invention is to provide a landscape edging which has a retaining strip of sufficient mechanical strength to resist deformation by downward or lateral forces yet which is sufficiently flexible to conform easily to changes in ground slope with minimal buckling or crimping.

A further object of the present invention is to provide a landscape edging which is sufficiently flexible so that when a force is exerted on one portion of the mowing strip, for example, by rolling a lawnmower over one part of the mowing strip, the downward force on that part of the mowing strip will not cause an upward force in other areas of the mowing strip, thereby loosening or pulling up the stakes or other means securing the landscape edging to the ground.

Another object of the present invention is to provide a landscape edging which minimizes the likelihood of becoming dislodged from its installed position by the natural expansion and contraction of the ground that results from freeze/thaw cycles, changes in ground moisture content, fire ant activity, or the like.

Another object of the present invention is to provide a landscape edging having a flange to prevent landscape fill from shifting or washing underneath the retainer strip.

Another object of the present invention is to provide a landscape edging having connectors with which adjacent edging sections are linked together quickly and easily to produce joints that preserve the mowing strip and retaining strip functions across the joint and that are stronger, neater, more permanent, and more aesthetically pleasing than joints provided by connectors currently in use.

Another object of the present invention is to provide landscape edging strips that require no adaptation or special parts to make end-to-end connections between adjacent landscape edging strips.

Another object of the present invention is to provide a landscape edging having corner sections that preserve the mowing strip and retaining strip functions at angled joints between edging sections.

Another object of the present invention is to provide corner sections that can be used to connect the adjacent, but angularly separated ends of two landscape edging strips without the need for special parts or for adaptation of the landscape edging strips.

SUMMARY OF THE INVENTION

These and other objects are achieved by providing in a preferred embodiment an elongated landscape edging strip formed of a thin gauge, flexible material, preferably polyethylene or a similar extrudable plastic or elastomeric material. In a preferred embodiment, the landscape edging strip has a substantially flat planar bottom support surface and comprises an upstanding, laterally reinforced retainer portion intermediate and integrally extruded with a flat, flexible, thin gauge mowing strip and a flat, flexible, thin gauge anchoring strip. In a preferred embodiment, the upstanding retainer portion in cross section has at least two walls and defines a channel, with one wall being integrally connected to the inner edge of the mowing strip and the other wall being integrally connected to the inner edge of the relatively narrow anchoring strip.

The retainer portion, mowing strip, and anchoring strip are secured in conformity to the ground contour along a landscape border. In preferred embodiments, the retainer portion abuts a fence or retains landscape fill on landscaping sheet having an edge secured underneath the landscaping edging strip.

With embodiments wherein said channel has a closed hollow profile and defines a longitudinally extending enclosed space, end-to-end connection of adjacent landscape edging strips may be readily accomplished with tubular or cylindrical connecting pegs inserted into the longitudinally extending enclosed spaces at the ends of abutting landscape edging strips and with C-shaped connecting clamps frictionally engaging the outer longitudinal edges of the mowing strips and anchoring strips at the ends of abutting landscape edging strips.

With embodiments wherein said channel is inverted and open-bottomed, end-to-end connection of adjacent landscape edging strips may be readily accomplished by simply overlapping the leading edge of one strip with the trailing edge of the adjacent strip. Corner connections can be similarly constructed by overlapping the adjacent but angularly separated ends of the landscape edging strips with a corner section having a configuration conforming to the overlapped adjacent ends of the landscape edging strips.

Further objects and advantages of the invention will be readily apparent to those skilled in the art from the following detailed description, taken in conjunction with the annexed sheets of drawings, on which are shown several preferred embodiments of the invention.

BRIEF DESCRIPTION OF THE DRAWINGS

FIG. 3 is a vertical cross-sectional view taken on the plane 3—3 of FIG. 2 showing the apparatus of FIG. 1 in use to divide a bed of landscape fill from a lawn area.

FIG. 4 is a perspective view of the landscape edging of FIG. 1 in use as a fence guard.

FIG. 5 is an exploded perspective view of an alternative embodiment of the landscape edging constructed in accordance with the principles of the present invention.

FIG. 6 is an exploded perspective view of another alternative embodiment of the landscape edging constructed according to the principles of the present invention.

FIG. 10 is a sectional view taken on the plane 10—10 of FIG. 9.

FIGS. 11A, 11B, 11C and 11D represent alternate cross-sectional configurations of the landscape edging strip of FIG. 8.

FIG. 12 is a perspective view showing the method of longitudinally interconnecting landscape edging strips constructed in accordance with the modification of FIG. 8.

FIG. 13 is a perspective view illustrating the connection of the ends of landscape edging strips adjoining each other at a corner of the landscaped area.

DESCRIPTION OF THE PREFERRED EMBODIMENTS

Figure 1:
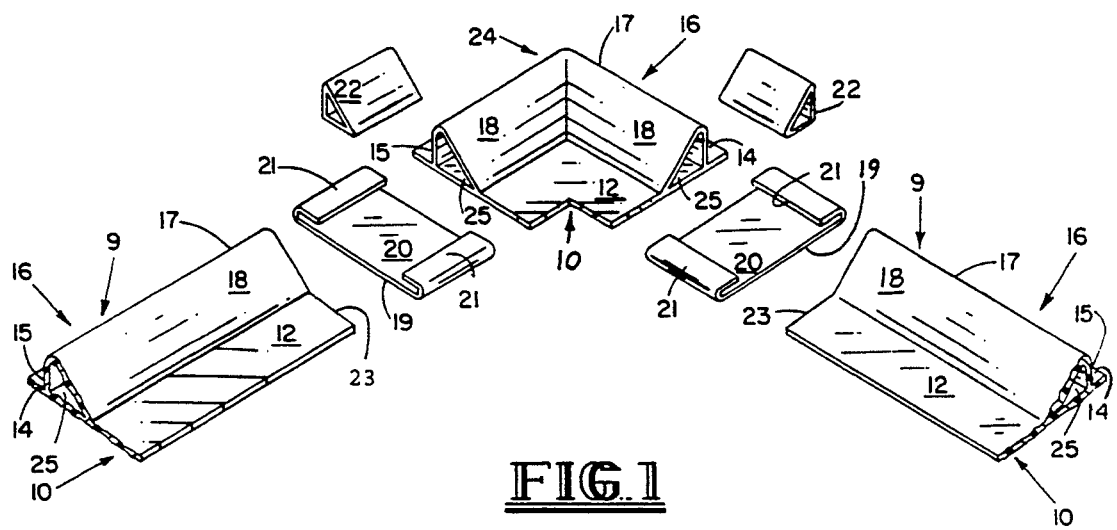
FIG. 1 is an exploded perspective view of the component parts of a landscape edging constructed according to the principles of the present invention.
Figure 2:
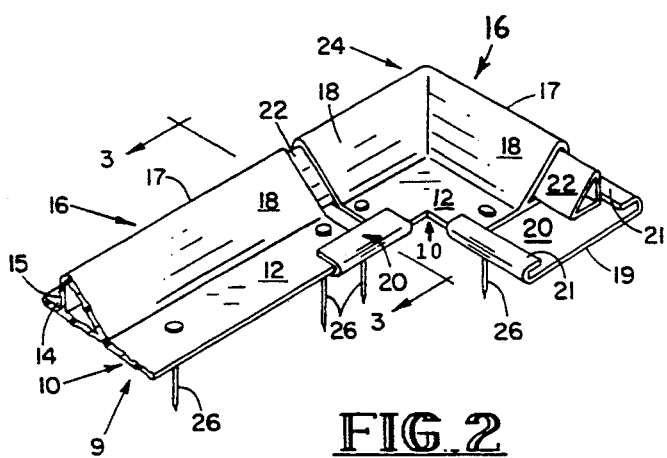
FIG. 2 is a perspective view of the landscape edging of FIG. 1.

Referring to FIGS. 1 and 2, there is shown a landscape edging strip, indicated generally at 9, constructed according to the teachings of the present invention. Landscape edging strip 9 comprises a base portion 10 to which is integrally secured an upstanding hollow retainer portion 16. The retainer portion 16 is preferably located adjacent a longitudinal edge of the base portion 10 and is closer to one longitudinal edge than the other, thus defining a flat mowing strip 12 of substantial width and a narrow width anchoring strip 14 on opposite sides of the retainer portion 16. The width of the base portion 10 in a presently preferred embodiment is at least about 6 inches to prevent growth of grass or grass roots under the base portion 10 of the landscape edging 9.

The landscape edging strip is preferably formed by extrusion of polyethylene or any similar extrudable, grass-impermeable, water resistant plastic or elastomeric resilient material. Preferably the edging strip is formed of opaque material to better block out light to the area beneath the base portion 10. In a preferred embodiment, the plastic or elastomeric material is between about 0.03 and about 0.125 inches thick.

The retainer portion 16 comprises an upstanding active wall portion 15 which is integral with and substantially perpendicular to the base portion 10, and a buttressing or reinforcing component 18 also integral with the base portion 10. In a presently preferred embodiment, the upstanding perpendicular wall portion 15 and the buttressing component 18 of retainer portion 16 cooperate with the base portion 10 to form a longitudinally extending enclosed space 25 having a triangular vertical cross-section.

The upper edge or vertex 17 of retainer portion 16 is preferably rounded about a longitudinal axis. In a presently preferred embodiment, the upper edge 17 is provided with a radius of curvature greater than 10% of the height of the perpendicular portion 15 of retainer portion 18. For instance, if perpendicular portion 15 is 2 inches in height, the radius of curvature of the edge 17 is preferably greater than 0.20 inches. I have found that rounding the upper edge 17 in this manner substantially increases the resistance of the retainer portion strip 16 to buckling or crimping when the landscape edging strip 9 is bent to conform to changes in ground slope.

Landscape edging strip 9 is fabricated in as great a length as permits the convenient transportation of the strip from the point of manufacture to the point of installation. Preferably, the landscape edging strip 9 is manufactured in minimum lengths of about 16 feet. The strip is then cut to the desired length, or a plurality of strips are assembled end to end to achieve the desired length at the time of installation.

As mentioned above, the landscape edging strip 9 is preferably made of thin, flexible low density polyethylene, but any other extrudable non-water degradable plastic or elastomeric material may be utilized so long as the extrusion product is sufficiently flexible to permit the landscape edging strip 9 to readily conform to changes in ground slope.

A C-shaped connector 20 is provided for joining the ends of adjacent landscape edging strips 9, as illustrated in FIG. 2. Connector 20 has a flat bottom 19 and two overlapping edge components 21 for frictionally engaging the adjacent ends of base portions 10. The C-shaped connector 20 can be quickly and easily installed to join the ends 23 of adjacent landscape edging strips 9, thereby preventing growth of grass between sections of landscape edging strips 9. The C-shaped connector 20 can be formed from the same material used to make the landscape edging strips 9 and is preferably formed by extrusion of a continuous length having the cross-sectional configuration of C-shaped connector 20 and then cutting a number of connectors from such continuous length.

An insert connector 22 is provided for reinforcing the connection between two adjacent landscape edging strips 9 and eliminating all spaces between the adjacent ends of such strips. Connector 22 is of triangular cross-section so as to snugly fit within the hollow triangular spaces 25 of adjacent retainer portions 16. Connectors 22 can be formed from the same material used to make the landscape edging strips 9. Although shown in FIGS. 1 and 2 as having a hollow core construction, connector 22 can also have a solid core of construction (not shown). In a preferred embodiment, connector 22 is also produced by extrusion of a continuous length of the desired cross-section, and then cutting the continuous length to the desired length of connector 22.

When connector 22 is inserted within the hollow triangular spaces 25 of the adjacent ends of retainer portions 16, and the C-shaped connectors 20 are applied to the abutting ends of the base portions 10 of two adjacent edging strips 9, it is readily apparent that there are no open spaces through which grass, weeds or landscape fill can penetrate. Even though the connecting point may lie at the vertex of a ridge, or at the low point of a valley in the lawn area, a tight connection can nevertheless be effected due to the inherent flexibility of connectors 20 and 22 plus the flexibility of the adjoining end portions of the adjacent flexible edging strips 9.

Corner sections 24 are provided for ease in edging the corners of a bedding area (shown in FIGS. 1 and 2). Corner section 24 is provided with the same base portion 10, mowing strip 12, anchoring strip 14, and hollow retainer portion 16 as the edging strips 9, but is of angular configuration which may be a 90° angle, as shown in the drawings, or any other desired angle. Corners 24 can be fabricated by cutting two suitable lengths of the edging strip 9 along angular lines to provide the desired angular relationship between the two cut off portions of the edging strip. These portions can be welded together with the cut edges in abutment to define the desired angular relationship.

Referring to FIG. 2, there is shown a landscape edging strip 9 constructed in accordance with the present invention joined to a corner section 24. C-shaped connectors 20 and insert connectors 22 are shown in assembled relationship between the abutting end of the landscape edging strip 9 and one side of the corner element 24. Obviously, a second landscape edging strip 9 (not shown) can be readily assembled to the other end of the corner 24 by frictionally engaging the C-shaped connecting clamp 20 and the insert connector 22 to the second edging strip.

Spikes or stakes 26 are shown extending through the mowing strips 12 and, if desired, through the anchoring strip 14 to secure the landscape edging strip 9 and corner section 24 to the ground. The spikes or stakes 26 can be placed at any desired spacing to conform the landscape edging to changes in ground slope. Preferably, landscape edging strip 9 is nailed or staked to the ground at points of local minima in ground elevation. One spike or stake per three feet of elongate member length usually provides a sufficiently strong attachment to the ground. Spikes or stakes 26 may also be located to penetrate the C-shaped connectors 20.

Referring to FIG. 3, the anchoring of the landscape edging 9 to the ground is shown in vertical cross-section and the operation of the method of this invention will be apparent from this figure of the drawings. A landscaping sheet 29 is laid flat over the ground to block the sunlight. The landscape edging strip 9 is placed on the ground over the edge portion of the landscaping sheet 29 with the mowing strip 12 adjacent to a mowable lawn area 31 and anchoring strip 14 adjacent a bedding area 33. C-shaped connector 20 is secured to an end 23 of elongate base portion 10 and insert connector 22 is secured within the triangular space 25. Spikes or stakes 26 are driven through mowing strip 12 and landscaping sheet 29 into the ground. If additional securement is desired, spikes or stakes 26 can also be driven through anchoring strip 14 and landscaping sheet 29 into the ground to further secure the landscape edging 9 to the ground.

As depicted in FIG. 3, landscape edging strip 9 is adapted to retain landscape fill 35 directly on the horizontal surface of landscaping sheet 29 extending out from underneath edging strip 9. After the landscape edging 9 has been secured in place, landscape fill 35 can be layered over landscaping sheet 29 in the bedding area 33 adjacent to the retainer portion 16. Landscape fill 35, which can be sand, bark, loose mulch, or hard surface means such as concrete, asphalt, mortared brick, loose brick, paving stones, rock, gravel, or similar material, is spread over anchoring strip 14 and is retained by the active wall 15 of retainer portion 16. Anchoring strip 14 prevents the landscape fill 35 from shifting or washing underneath the landscape edging 9. Landscaping sheet 29 secured to the ground by landscape edging 9 in this manner will not: tear or split because the flexible landscape edging 9 always conforms to the contour of the ground surface, irrespective of heaving or contractions of such surface produced by alternate freezing and thawing, or changes in moisture content.

FIG. 4 shows the landscaping edging 9 in use as a fence guard. Landscape edging 9 is placed adjacent to a fence 37 with the retainer portion 16 initially parallel to the fence 37 and with anchoring strip 14 extending beneath the fence 37. Mowing strip 12 extends over a lawn area 39 adjacent to one side of fence 37 and is secured to the ground by spikes or stakes 26. The optional arrangement of two landscape edgings 9, one on each side of the fence 37, provides a mowing strip continuous with entire length of the fence 37 on each side thereof and prohibits growth of vegetation adjacent to fence 37. The retainer portions 16 thus serve the following functions. They fill in any gaps between the bottom of the fence 37 and the ground. They protect the bottom of fence 37 from damage by lawnmowers, lawn edging devices, or animals. They also protect lawnmowers, lawn edging devices, and animals from damage by the fence 37. Lastly, they discourage animals from digging underneath the fence 37.

Referring to FIGS. 1-4, anchoring strip 14 of landscape edging strip 9 provides the following synergistic functions. First, it provides an edge to frictionally engage one side of C-shaped connector 20. I have found that the combination of anchoring strip 14 and C-shaped connector 20 provides connections between landscape edging sections that are more secure than those made with connectors in the absence of anchoring strip 14. Second, anchoring strip 14 helps to secure landscape edging 9 to the ground by providing a structure through which nails or stakes 26 can be driven (as shown in FIG. 3), by providing a structure that can be pushed against the ground by the weight of landscape fill, or by being inserted underneath a fence (as shown in FIG. 4). Third, when landscape edging 9 is used in combination with landscape fill 35, anchoring strip 14 prevents the landscape fill 35 from shifting or washing underneath landscape edging 9. Fourth, when landscape edging 9 is used as a fence guard as shown in FIG. 4, the anchoring strip 14 prohibits growth of vegetation underneath and into fence 37.

An alternative embodiment of the present invention is shown in FIG. 5 wherein similar numerals indicate components identical to those previously described. Thus the landscape edging strip 109 comprises a base portion 100 and an upstanding integral retainer portion 116 which, however, defines an enclosed space 125 of rectangular configuration. Thus retainer portion 116 has parallel vertical walls 116a and 116b and a connecting generally horizontal top wall 116c. These walls cooperate with the top surface of the base portion 100 to define the enclosed space 125. A mowing strip 112 is defined on one side of the hollow upstanding retainer portion 116, and an anchoring strip 114 on the other side. Obviously, the insert connectors 122 utilized in this modification have the same configuration as the enclosed space 125. The C-shaped connectors 20 are, however, identical to those employed in the previously described modification.

A third modification 209 of this invention is shown in FIG. 6 wherein the upstanding retainer portion 216 is integral with base portion 200 and defines an annular or tubular configuration. Connectors 222 are therefore formed of cylindrical shape so as to snugly conform to the cross-sectional shape of the enclosed space 225 defined by the upstanding retainer portions 216. Mowing strip 212 and anchoring strip 214 are defined on opposite sides of retainer portion 216.

Figure 7:
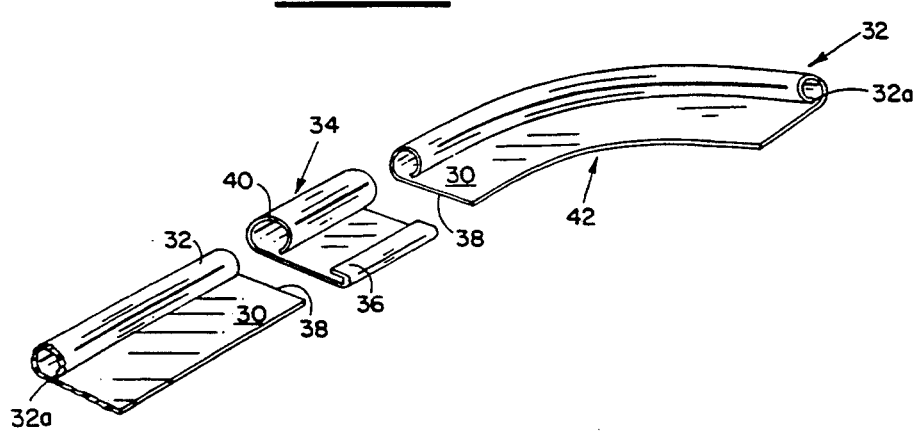
FIG. 7 is an exploded perspective view of a third alternative embodiment of a landscape edging constructed according to the principles of the present invention.

Some advantages of this invention may also be obtained with the construction shown in FIG. 7. Edging strip 30 comprises a base portion 38 which functions as the mowing strip and has integrally secured to one longitudinal edge thereof an upstanding loop retainer portion 32 having its free edge 32a abutting the top surface of the mowing strip 38. The connectors 34 for securing the ends of adjacent elongated edging strips 30, as illustrated with arcuate element 42, have a slightly modified configuration. Thus, one edge defines a relatively small overlap portion 36 for engaging the adjacent outer edge of the mowing strips 38, while the other edge defines a loop 40 of sufficient diameter so as to snugly surround the loop retainer portions 32 of the longitudinal edging strips 30. Insert connectors are not required for this modification.

In their uppermost portions, the transverse cross-sectional profiles of retainer portions 16, 116, 216, and 32 define inverted hollow channels. However, the transverse cross-sectional profiles of retainer portions 16, 116, and 216 are also hollow and closed in their entireties. Therefore, in the modifications of this invention shown in FIGS. 1-7, the retainer portions 16, 116, and 216 define the longitudinally extending enclosed spaces 25, 125, and 225 respectively in their entirety. In other words, in the modifications of this invention shown in FIGS. 1-7, upstanding retainer portions 16, 116, 216, and 32 constitute elongated hollow tubular channels, and, being formed of a flexible plastic or elastomeric material, such tubular channels will readily bend to conform to vertical deviations in the ground contour. At the same time, by virtue of their inverted hollow channel-shaped transverse cross sections, retainer portions 16, 116, 216, and 32 are reinforced laterally to provide substantial transverse rigidity to forces applied laterally by the landscape fill. By way of analogy, a plastic hose will readily bend in any direction and thus will conform to an undulating ground surface, but if a lateral compressive force is applied to just one wall of the hose and the hose is restrained from lateral movement by being longitudinally secured to the ground, then a substantial compressive force has to be exerted on the wall of the hose to produce any significant deformation thereof in a lateral direction.

If additional lateral stiffness is required for hollow retainer portions 16, 116, 216 or 32, such may be provided by inserting and frictionally engaging a spring coil of wire or plastic within the hollow, longitudinally extending chambers of retainer portions 16, 116, 216, or 32. Such inserted coil will provide additional lateral stiffness to the retainer portion without in any manner decreasing the vertical flexibility of the lawn edging strip or its ability to conform to changes in ground slope.

Referring now to FIGS. 8-13, there are disclosed alternative embodiments of this invention which simplify the manufacture of the landscape edging strip, and the assemblage of the edging strips in end to end relationship and also at those points where the landscape edging strip has to traverse a corner.

The landscape edging strip 300 now comprises, in vertical cross section, a relatively wide mowing strip 310 which is integrally connected at its inner edge with the bottom edge of a wall 322 of an upstanding retainer portion 320. The other wall 324 of the retainer portion 320 is integrally secured at its bottom edge to the inner edge of a relatively narrow anchoring strip 350. The wall 324 of retainer portion 320 is preferably of a generally vertical configuration. Wall 322 thus functions as a reinforcement for wall 324. As in the other modifications, the landscape edging strip 300 is formed by any thin gauge, readily deformable water resistant plastic or elastomeric resilient material.

As shown in FIGS. 11A-11D, the retainer portion 320 may comprise any one of a plurality of different configurations. Thus in FIG. 11A, the retainer portion 320 has two vertical wall portions 323 and 325 interconnected by a semi-circular top portion 326. In FIG. 11B, the retainer portion 320 defines an essentially circular cross sectional configuration having an interrupted circular wall 330 connected at one bottom edge 332 to the inner edge of the anchoring strip 350 and the other bottom edge 334 connected to the inner edge of the mowing strip 310.

In the modification of FIG. 11C, the retainer portion 320 has two vertical walls 336 and 338 integrally interconnected by a generally horizontal top wall 340.

In the modification of FIG. 11D, the retainer portion 320 comprises two parallel vertical walls 342 and 344 which are integrally connected by upwardly angling walls 346 and 348.

Figure 9:
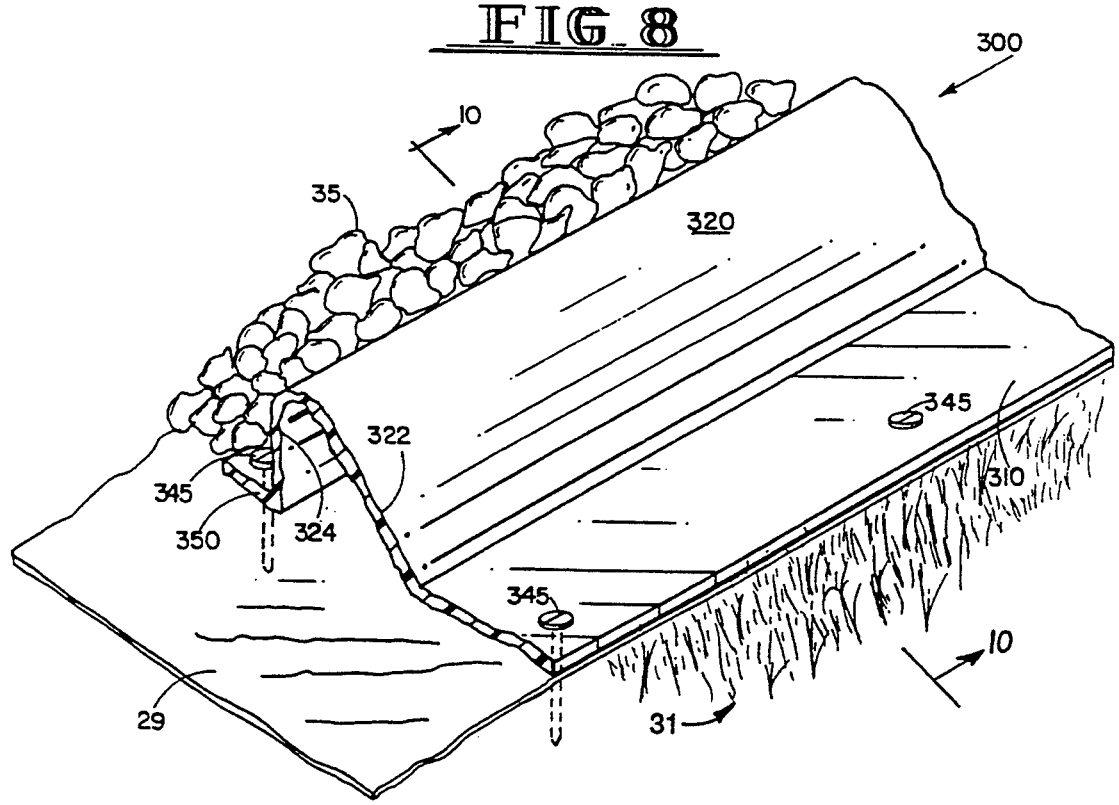
FIG. 9 is a perspective view illustrating the utilization of the landscape edging of FIG. 8 to separate a bed of landscape fill from a mowed lawn area.

From these various examples, it is apparent that the primary characteristics of the retainer portion 320 of landscape edging strip 300 are that it extends upwardly from both anchoring strip 350 and mowing strip 310 and that it forms an inverted hollow channel which is open only at the bottom but which is closed by the adherence of the anchoring strip 350 and the mowing strip 310 to the ground through the driving of spikes or stakes 345 therethrough and into the ground. The outer longitudinal edges of mowing strip 310 and anchoring strip 350 are generally parallel and substantially free. As shown in FIGS. 9 and 10, landscaping sheet 29 may be secured between the ground and the landscape edging strip 300 by the same spikes or stakes 345. The mowing strip 310 is thus accurately conformed to the contour of the ground adjacent the grass or mowed area 31, and the anchoring strip 350 is equally conformed to the ground contour adjacent to the mowed area but overlies an unmowed area. As shown in FIGS. 9 and 10, the upstanding retainer portion 320 functions to retain landscape fill 35 such as brick, rock, gravel, sand, bark, loose mulch, or similar material from encroaching onto the mowed area 31 and, by having at least two walls, is reinforced against displacement by the landscape fill.

The landscape edging strips of FIGS. 8, and 11A–11D have the further advantage of simplifying the longitudinal junction of two such landscape edging strips. As shown in FIG. 12, the one end 300a of one landscape edging strip 300 can be superimposed over the adjacent end 300b of the other landscape edging strip 300 and the two edging strips secured together by spikes or stakes 345 driven through the overlapping portions of mowing strips 310 and of anchoring strips 350.

The formation of the landscape edging strips to conform to corners in the mowed area is similarly simplified, as illustrated in FIG. 13. A corner section 316 is readily fabricated by cutting two short pieces 316a and 316b from a landscape edging strip 300 and then angularly cutting one end of each of the two short pieces at an angle equal to one half of the angle desired when the short pieces are adhesively secured together as indicated by the line 316c. Again, the corner section 316 may be secured to the angularly adjacent ends of the landscape edging strips 300 by driving spikes or stakes 345 through the overlapping portions of mowing strips 310 and anchoring strips 350. Of course, the corner section 316 may also be fabricated by injection molding or vacuum forming a flexible plastic material conforming generally to the composition of the material from which the landscape edging strips 300 are fabricated.

Figure 8:
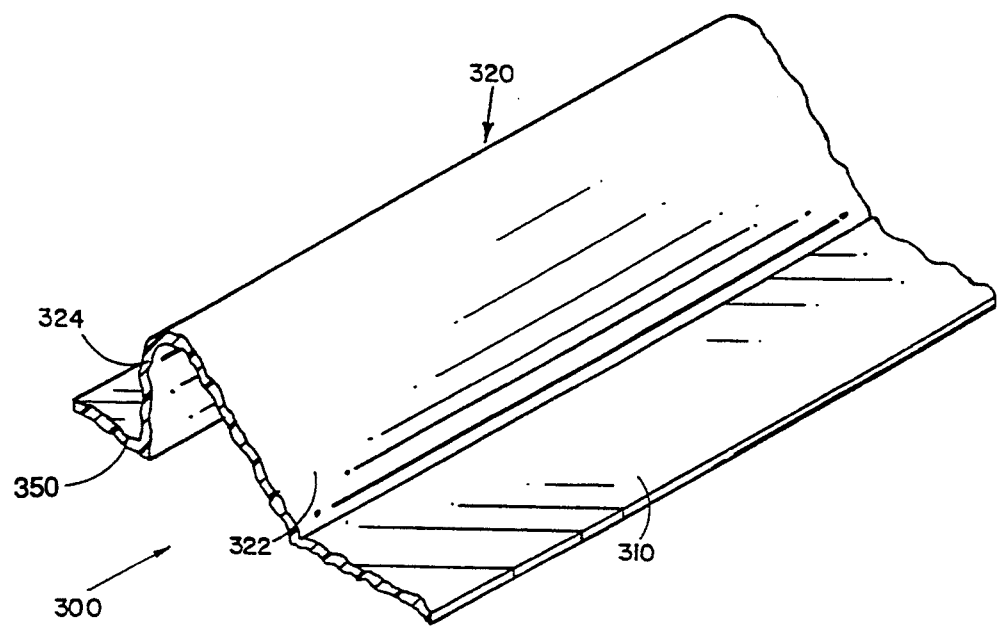
FIG. 8 is a perspective view of a still further embodiment of the landscape edging constructed according to the principles of the present invention.

Referring to FIGS. 8–10, anchoring strip 350 of landscape edging strip 300 has the following synergistic functions in addition to those described earlier for anchoring strip 14 of landscape edging strip 9. Anchoring strip 350 also in two ways increases the resistance of retainer portion 320 to deformation by downward or lateral forces. First, it furnishes a structure with which the bottom edge of vertical wall 324 of retainer portion 320 can be secured to the ground. Second, when stakes are used for this purpose, anchoring strip 350 also serves as a structure that reinforces the bottom edge of vertical wall 324 between staked positions. By serving as an alternate means for giving mechanical strength to retainer portion 320, anchoring strip 350 allows deletion of that part of the base portion 10 which underlies retainer portion 16 between mowing strip 12 and anchoring strip 14 of landscape edging strip 9 (FIGS. 1–4). The landscape edging strip 300 that results from such deletion has the following advantages over the landscape edging strip 9. It is less expensive to manufacture, because it requires less material and because it does not require a vacuum sizer or similar device to maintain the shape of an extruded hollow structure on cooling. It can also be packaged, shipped, stored, and merchandized at lower cost, because it can be stacked more densely and more easily. Finally, landscape edging strips 300 require no adaptation or special parts to make end-to-end connections between adjacent strips.

The MS/RS combinations of the present disclosure are much more easily installed than combinations from the prior art. The ease of installation is due to the following factors. First, the MS/RS combinations of the present disclosure have no subterranean component that must be buried into the ground, because they have a substantially flat planar support surface across their undersurface adapted to rest upon an underlying horizontal ground surface which extends out from underneath the edging strip. For landscape edging strips 9, 109, 209, and 30, this flat planar support surface is the bottom of respective base portions 10, 100, 200, and 38. For landscape edging strip 300, this flat planar support surface is the bottom of mowing strip 310 and the bottom of anchoring strip 350.

Second, the MS and the RS are integrally attached, thus avoiding separate installation of these components in two steps. Third, a single integral part provides a complete MS/RS combination for a length that would require careful assembly of many relatively complicated components in a segmented MS/RS combination. Fourth, when constructed of materials such as polyethylene or elastomers, MS/RS combinations of the present invention can be attached to the ground with spikes or stakes driven directly through the MS after the MS/RS combination is placed in its desired position. This method of attachment avoids the need to prefabricate means for accommodating stakes or other fastening means and also avoids the difficulty of installing MS/RS combinations having integrally attached stakes. Fifth, the MS/RS combinations of the present invention are adequately secured to the ground with far less structure (approximately one stake per 3 feet of MS/RS length) than required by prior art MS/RS combinations.

Edges of landscaping sheet can be secured effectively by staking a MS/RS combination of the present invention directly onto the landscaping sheet edge. Landscaping sheet edges secured in this fashion are free of stress and are less likely to be torn or to pull out than such edges secured by prior art landscape edgings with underground components. Because MS/RS combinations of the present invention are easily removed and reinstalled, landscaping sheet with edges secured by such combinations are easily maintained or replaced.

When constructed from flexible materials such as polyethylene or elastomers, MS/RS combinations of the present invention conform easily to changes in ground slope with minimal buckling or crimping. Prior art MS/RS combinations, which do not conform easily to changes in ground slope, have all of the resulting problems described earlier.

Even when constructed of a flexible material such as polyethylene or an elastomer, the retaining strips in the combinations of the present invention have mechanical strength sufficient to resist deformation by downward or lateral forces. When constructed of a flexible material such as polyethylene or an elastomer, the RS of MS/flat vertical wall RS combinations cannot easily be made to provide comparable resistance to deformation by downward or lateral forces and will always have virtually no resistance to buckling or crimping when bent to conform to changes in ground slope.

For the following reasons, MS/RS combinations of the present disclosure are more easily maintained than those of the prior art. First, the MS/RS combinations of the present disclosure are of the continuous elongated type and therefore have a minimum number of joints requiring maintenance.

Second, the MS and RS are integrally attached in the preferred embodiments of the present invention. Such integral attachment virtually eliminates the possibilities of the MS and RS becoming separated and of grass encroaching through the resulting gap.

Third, the presently disclosed MS/RS combinations are relatively flexible and conform to changes in ground slope with minimal mechanical stress on stakes or other ground fastening means. Thus the presently disclosed MS/RS combinations are less likely to be pulled up from the ground than those of the prior art. For example, the presently disclosed MS/RS combinations, unlike those having rigid MS, do not have the problems of tending to pull ground-fastening means such stakes up out of the ground as a lawnmower is rolled onto the MS. For similar reasons, the presently disclosed landscape edgings are less likely to become dislodged from their installed positions by the natural expansion and contraction of the ground that results from freeze-thaw cycles or changes in ground moisture content.

Fourth, the presently disclosed MS/RS combinations can be secured to the ground with stakes that are installed and can be removed individually one at a time while keeping the MS/RS combination in a fixed position. Such ground-fastening means allow an isolated portion of a continuous elongated MS/RS combination to be maintained without disturbing other portions of the combination that do not require maintenance. In contrast, continuous elongated MS/RS combinations with integrally attached stakes or with underground components usually require complete removal and reinstallation of a much longer portion of the MS/RS combination than that actually requiring maintenance. The ability to service isolated areas of an MS/RS combination without affecting areas of the combination not requiring maintenance is particularly important when the MS/RS combination is used to secure the edges of landscaping sheet.

The retainer portions of the present invention are not necessarily longitudinally continuous. In alternate embodiments of the present invention (not shown), retainer portions 16, 116, 216, 32, and 320 may be slit transversely at longitudinally spaced intervals or may comprise a generally longitudinally extending series of retainer portion segments separated by small longitudinal gaps. The alignment of such retainer portion segments is preferably achieved by integral attachment of the retainer portion segments to a mowing strip or anchoring strip that is continuous along the full longitudinal length of the landscape edging strip.

FIGS. 1-3 depict landscaping-support or landscape fill edge restraining apparatus 9 for edging and restraining landscape fill 35 in a given position on a ground or base surface. Landscape fill 35 can be hard surface means such as paving stones, brick, asphalt, or concrete. Continuous planar vertical strip 15 is a restraining means for defining a boundary around the landscape fill 35. Vertical strip 15 includes a border length parallel to the boundary of landscape fill 35. Vertical strip 15 has an inner first side surface facing toward the landscape fill 35 for receiving substantially horizontal forces from the landscape fill 35. Vertical strip 15 also has an outer second side surface facing away from the landscape fill. Extending out laterally or transversely from the outer second side surface in a lower region of vertical strip 15 is continuous planar horizontal base strip extension means 10. Base strip 10 and vertical strip 15 have a continuous juncture line parallel to the defined boundary of landscape fill 35. Lower lip 14 extends from the inner first side surface of vertical strip 15 in the same plane as base strip 10. Extending out laterally and downwardly from the outer second side surface in an upper region of vertical strip 15 is continuous planar connecting strip means 18. Connecting strip 18 connects or interconnects vertical strip 15 to base strip 10 such that connecting strip 18, a portion of vertical strip 15, and a portion of base strip 10 form a triangular cross section that is a closed hollow profile 25. The triangular cross section includes a right triangle and connecting strip 18 is a hypotenuse of the right triangle. Vertical strip 15, base strip 10, and connecting strip 18 are a continuous extrusion. Connecting strip 18 is a force converting means for converting the horizontal forces received by vertical strip 15 into vertical forces into or against base strip 10 and the ground or base surface, thereby restraining landscape fill 35 within the boundary. Base strip 10 receives vertical forces relative to the ground surface. Vertical strip 15 has sufficient flexibility to flex back into shape after experiencing horizontal forces caused by traffic travelling over landscape fill 35. Vertical strip 15 is flexibly formed to accommodate irregular shaped boundaries around said landscape fill. Connecting strip 18 may include cut out portions along intervals of the vertical strip 15 border length. Base strip 10 may also include cut out portions corresponding to the cut out portions of connecting strip 18. Connecting peg means 22 connects adjacent sections of vertical strip 15 by being wedged into the closed hollow triangular cross sectional profile 25 formed in between vertical strip 15, connecting strip 18, and base strip 10. Landscape edging apparatus 9 is secured in position with stake anchoring means 26 engaged into the ground or base surface.

Although the present invention has been described in terms of the above embodiments, it will be recognized by those skilled in the art who have the benefit of this disclosure that certain modifications may be made to those embodiments without departing from the spirit and scope of the invention as set out in the following claims.

What is claimed and desired to be secured by Letters Patent is:

1. Landscape apparatus comprising landscape fill and restraining apparatus edging and restraining said landscape fill on a base surface, said restraining apparatus comprising:

substantially vertical strip restraining means defining a boundary adjacent said landscape fill, said substantially vertical strip restraining means including a first side surface facing toward said landscape fill for receiving substantially horizontal forces from said landscape fill and a second side surface facing away from said landscape fill;

substantially horizontal extension means extending out laterally from said second side surface of said substantially vertical strip restraining means;

force converting means for converting said horizontal forces received by said substantially vertical strip restraining means into vertical forces against said substantially horizontal extension means thereby restraining said landscape fill in said boundary; and a lower lip extending from said first side surface of said substantially vertical strip restraining means substantially in the same plane as the substantially horizontal extension means.

2. Landscape apparatus comprising landscape fill and restraining apparatus edging and restraining said landscape fill on a base surface, said restraining apparatus comprising:

substantially vertical strip restraining means defining a boundary adjacent said landscape fill, said substantially vertical strip restraining means being flexibly formed to accommodate for irregular shaped boundaries around said landscape fill, said substantially vertical strip restraining means including a first side surface facing toward said landscape fill for receiving substantially horizontal forces from said landscape fill and a second side surface facing away from said landscape fill;

substantially horizontal extension means extending out laterally from said second side surface of said substantially vertical strip restraining means; and force converting means for converting said horizontal forces received by said substantially vertical strip restraining means into vertical forces against said substantially horizontal extension means thereby restraining said landscape fill in said boundary.

* * * * *